Oct. 11, 1932.  E. R. LAIRD  1,882,020
ART OF MANUFACTURING SHANK PIECES
Filed Jan. 16, 1926    2 Sheets-Sheet 1

INVENTOR.
Eversleigh R. Laird
By his Attorney,
Nelson W. Howard

Oct. 11, 1932. E. R. LAIRD 1,882,020
ART OF MANUFACTURING SHANK PIECES
Filed Jan. 16, 1926 2 Sheets-Sheet 2

Patented Oct. 11, 1932

1,882,020

UNITED STATES PATENT OFFICE

EVERSLEIGH R. LAIRD, OF BROCKTON, MASSACHUSETTS, ASSIGNOR TO UNITED SHANK & FINDINGS COMPANY, OF BOSTON, MASSACHUSETTS, A CORPORATION OF MASSACHUSETTS

ART OF MANUFACTURING SHANK PIECES

Application filed January 16, 1926. Serial No. 81,765.

This invention relates to improvements in the art of manufacturing shank pieces, to improved machines for operating upon shank pieces, and to improved shank pieces. The machine herein illustrated as embodying the invention is particularly adapted for performing finishing operations upon wooden shank pieces.

Wooden shank pieces for use in welt or McKay sewed shoes are adapted to be positioned between the insole and the outsole and they are commonly made with their opposite lateral margins beveled at the outsole-engaging side of the shank piece to avoid interference with the transverse molding of the shank portion of the outsole in the sole laying or in the sole leveling operation. Usually the angle of bevel is such that sharply defined shoulders or ridge-like projections are formed between the inner edges of the beveled margins and the adjacent unbeveled surface of the shank piece and these shoulders are liable to become embedded in the sole under the heavy pressure exerted by the sole laying and the sole leveling machines with the result that corresponding lines or ridges are apt to be formed in the outer surface of the outsole of the finished shoe.

One object of the present invention, accordingly, is to insure against the presence of undesirable lines or ridges in the outsole or other undesirable results caused by the presence of shoulders, such as above referred to, on the shank pieces.

With this object in view the invention provides a machine for operating upon shank pieces of the abovementioned type which, as herein illustrated, comprises a work support, rotary members for performing finishing operations upon a shank piece on the work support, and an abutment member extending above the work support and located in the path of feed of the shank piece for producing relative movement between the shank piece and the rotary finishing members to enable the latter to perform finishing operations upon the shank piece as it feeds the shank piece, the abutment member being rendered operative by movement imparted thereto by the shank piece. The illustrated finishing members consist of sanding rolls and the illustrated work support comprises a pair of spaced yielding fingers constructed and arranged to hold a shank piece in feeding engagement with the sanding rolls. The illustrated abutment member is arranged to extend between the work-supporting fingers so as to be engaged by the work and moved thereby only sufficiently to operate a clutch connecting the abutment member with a driven part of the machine for movement at a slower rate of speed than that of the peripheries of the sanding rolls.

The invention will best be understood from the following description, reference being had to the accompanying drawings in which Fig. 1 is a perspective view of a shank piece finishing machine embodying certain features of the present invention;

As already explained, wooden shank pieces are commonly made with beveled lateral margins forming well defined shoulders on the outsole-engaging surfaces of the shank pieces and these shoulders are liable to produce objectionable lines or ridges upon the tread face of the sole of a finished shoe in which the shank piece is to be incorporated. The machine herein illustrated is adapted to remove these shoulders from the shank pieces by means of a grinding or abrasive action which grinds off the shoulders and causes the beveled margins of each shank piece to merge gradually with the unbeveled surface of the outsole-engaging side of the shank piece.

Figure 2:
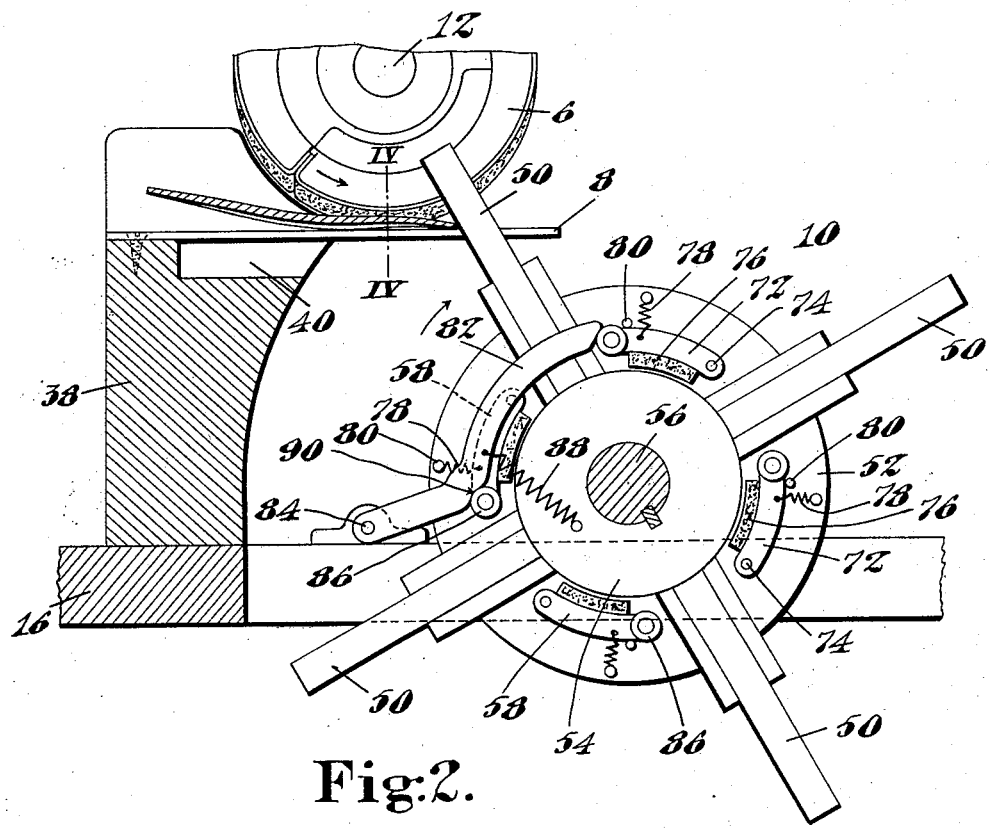
Fig. 2 is a sectional view of a portion of the machine shown in Fig. 1, the section being taken along the plane indicated by the line II—II in Fig. 1.

To this end the illustrated machine, by the use of which the novel method of this invention may advantageously be practised, is provided with a pair of sanding rolls 6, 6, a pair of spring fingers 8, 8 arranged to hold a shank piece yieldingly against the peripheries of the two sanding rolls in such a manner that the shank piece will be fed along the supporting fingers by the rotative actions of the sanding rolls, and a feed retarding device, indicated generally at 10 in Fig. 2, for engaging each shank piece and causing it to advance at a rate less than the peripheral speed of the sanding rolls so that the latter will exert a grinding action as well as a feeding action upon the shank piece.

The sanding rolls 6, 6 as herein shown are the usual form of sanding or scouring rolls having peripheries covered by sand paper or other suitable abrasive means. The sanding rolls are fixed to the inner ends of two shafts 12, 12 which are journaled in suitable bearings formed in brackets 14, 14 secured to a bed plate 16 which is supported upon upright frame members 18, 18. The shafts 12, 12 are inclined to the horizontal at angles equal to approximately one-half the angle of bevel of the lateral faces of the shank pieces to enable the sanding rolls to function most effectively to smooth or round off the shoulders on the shank pieces. The sanding roll shafts 12, 12 are driven from a horizontal shaft 20 by means of belts 22 passing over pulleys 24 on the shafts 12 and pulleys 26 on the shaft 20. The shaft 20 in turn is driven from an electric motor 28 by means of a belt 30 passing over a pulley 32 on the motor shaft and a pulley 34 on the shaft 20.

The shank piece supporting fingers 8, 8 extend horizontally in the direction of feed beneath the sanding rolls and they are arranged side by side and spaced apart to permit the work-engaging portions of the feed retarding device 10 to move between the fingers into operative positions in the path of movement of the shank pieces. As shown, the fingers 8 are secured at their forward ends to a block 38 on the bed plate 16 while the rear extremities of the fingers are unsupported. The block 38 is cut away, as shown at 40, to enable the fingers 8 to yield freely as the shank pieces are received between the fingers and the sanding rolls.

Figures 3, 4:
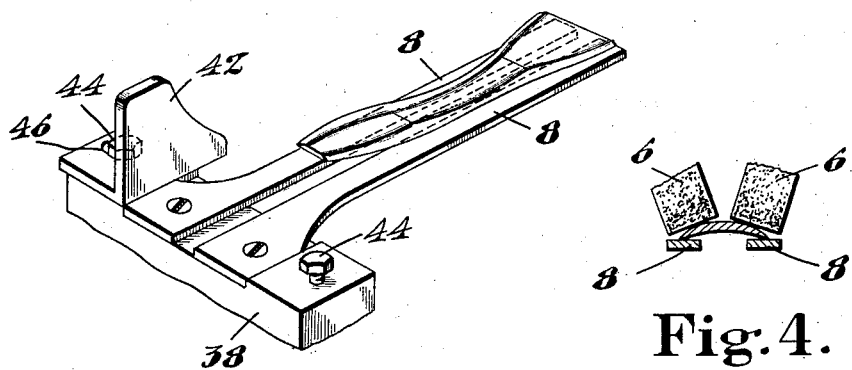
Fig. 3 is a perspective view showing particularly the means for supporting a shank piece while it is being operated upon in the machine.
Fig. 4 is a detail sectional view taken along the line IV—IV of Fig. 2.

The shank pieces are introduced endwise and fed lengthwise beneath the sanding rolls and in order to center the shank pieces widthwise with respect to the sanding rolls a pair of edge guides 42, formed from strips of angle iron, are secured to the block 38 at opposite sides of the fingers. In order to accommodate shank pieces of different widths the edge guides 42 are mounted with provision for adjustment toward and from each other, being secured to the block 38, as shown in Fig. 3, by means of bolts 44 which extend through slots 46 in the edge guides.

Each shank piece is fed by the sanding rolls into engagement with a portion of the feed retarding device 10 which slows up the advance of the shank piece causing it to move at a rate slower than the peripheral speed of the sanding rolls, thus rendering the sanding rolls effective to grind away the portions of the shank piece which are held in contact therewith.

Figure 1:
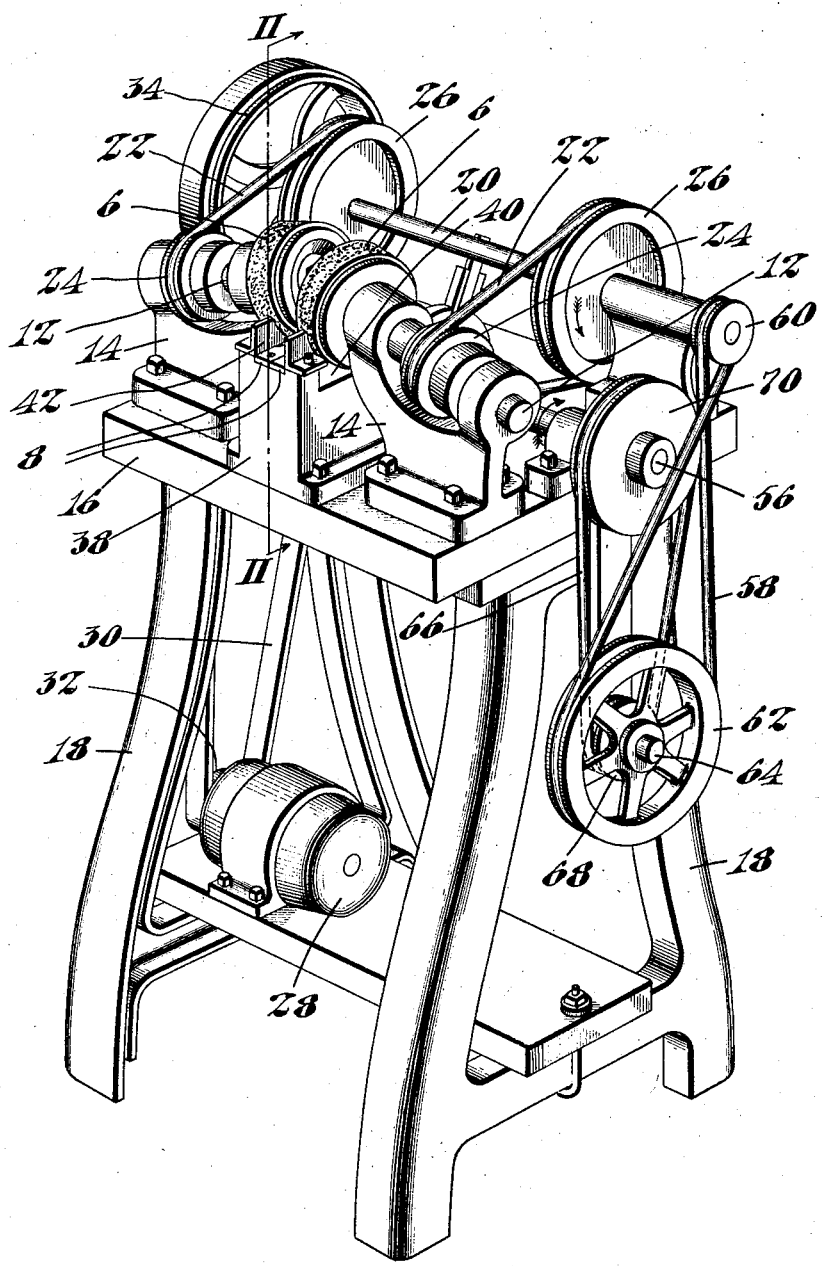

The feed retarding device 10 comprises a plurality of radially disposed work engaging arms 50 and these arms are equally spaced apart around the periphery of a drum 52 encircling a hub 54 that is fast upon a horizontal shaft 56. The shaft 56 is arranged to be driven at a slower speed than the shaft 20 by speed reducing connections comprising a belt 58 (Fig. 1) passing over pulleys 60 and 62 on the shaft 20 and on a fixed stud 64, respectively, and a belt 66 which passes over a pulley 68 compounded with the pulley 62 and also over a pulley 70 which is fast upon the shaft 56. The drum 52 is loosely mounted upon the hub 54 so that it is capable of turning faster than the hub but means is provided for clutching the drum to the hub so that it will be constrained to turn in unison with it. This means comprises a plurality of clutch members 72 each of which is pivoted at 74 to the drum 52 and is adapted to swing about its pivot 74 to move a segmental shoe 76 carried thereby into and out of frictional engagement with the periphery of the hub 54. Normally, the several clutch members 72 are held disengaged from the hub 54 by means of spring 78 carried by the drum 52, the springs tending to swing the clutch members outwardly and serving to hold them in engagement with stop pins 80 on the drum. The clutch members 72 are adapted selectively to be forced inwardly into frictional engagement with the rotating hub 54 by means of a segmental cam 82 which is pivoted at 84 to a fixed part of the machine frame and which is arranged to co-operate with a plurality of cam rolls 86 severally carried by the clutch members 72. The cam 82 is held in operative position in the path of the cam rolls 86 by means of a spring 88 fastened at one end to the cam and at the other end to a portion of the machine frame.

When no shank piece is being operated upon by the sanding rolls the drum 52 with its radial arms 50 remains at rest, the drum being held against turning with the hub 54 by engagement of the cam roll 86, carried by one of the clutch members 72, with a notch or depression 90 formed in the cam 82. The engagement of any one of the cam rolls 86 with the depression 90 in the cam 82 serves also to position the drum 52 with one of the radial arms 50 projecting upwardly across the path of feed of the shank pieces, as shown in Fig. 2.

When a shank piece has been introduced between the sanding rolls 6 and fingers 8 it will be advanced by the action of the rolls into engagement with the upwardly extending arm 50 of the drum 52, and continued forward movement of the shank piece will advance the arm 50 and turn the drum 52 until the cam roll 86 which is engaging the cam 82 rides out of the depression 90, this movement of the cam roll being effective to swing the respective clutch member 72 inwardly to engage its shoe 76 with the periphery of the hub 54. The cam 82 is enabled to move the clutch members inwardly in this manner inasmuch as the spring 88 which acts upon the cam 82 is stronger than the springs 78 which tend to move the clutch member outwardly. After one of the clutch members 72 has been moved into engagement with the hub 54 the rotation of the drum 52 will be slowed down and the drum will be constrained to turn in unison with the hub for substantially a quarter of a revolution, at the end of which the cam roll 86 will leave the cam 82 and the clutch member will be swung outwardly by its spring 78 so that it will be disengaged from the hub 54 and the drum 52 will be brought to rest with the cam roll 86 carried by the succeeding clutch member 72 in engagement with the depression 90 in the cam 82 and consequently with another arm 50 extending across the path of feed of the shank pieces. The parts are so proportioned that each arm 50 will advance in the line of feed of the shank pieces far enough at each step movement of the feed retarding device to permit the longest shank pieces which are bite of the sanding rolls. As each shank piece to be operated upon to be fed beyond the is advanced beyond the sanding rolls, it drops off from the supporting fingers 8 and may be received in a suitable receptacle (not shown).

The invention having been described, what is claimed as new and desired to be secured by Letters Patent of the United States is:

1. In a machine of the class described, a finishing roll, a yielding work support comprising a pair of spaced fingers, means extending between said fingers and co-operating with the roll to feed a piece of work along the support at a different speed from that of the periphery of the roll, and means on the roll for performing a finishing operation on the work as the work is fed.

2. In a machine of the class described, a work support, a finishing member arranged to feed a shank piece along said support, a driving clutch member, a normally idle driven clutch member, an arm carried by the driven clutch member movable in a plane intersecting the path of movement of the shank piece and in the direction of said movement, and means for engaging the clutch members upon engagement of the shank piece with said arm and for disengaging the clutch members after the shank piece has moved away from the finishing member.

3. In a machine of the class described, a support across which a piece of work is adapted to be fed, a driven shaft provided with a hub, a drum mounted to turn on the hub, a plurality of radial arms on the drum adapted to be moved successively into the path of feed of the work, normally disengaged clutch mechanism for connecting the drum with the shaft, a rotary finishing member arranged to engage and operate upon a piece of work on the support and feed the work against one of said arms and thereby to turn the drum on the shaft, and means rendered operative by said turning of the drum to engage said clutch mechanism.

4. In a machine of the class described, a yielding support for a shank piece, a rotary buffing wheel for performing a finishing operation on the shank piece and for feeding the shank piece across the support, a drum provided with an abutment member adapted to be engaged by a shank piece on the support and moved thereby, a shaft driven at a lower rate of speed than the buffing wheel on which the drum is mounted, normally disengaged clutch mechanism for connecting the drum with the shaft, means operated by movement of the drum on the shaft for engaging said clutch mechanism, and means for disengaging said clutch mechanism after a shank piece has been fed past the buffing wheel.

5. In a machine of the class described, a work support, a rotary member for performing finishing operations upon a piece of work on the support, and an abutment member extending above said support and located in the path of feed of the work for producing relative movement between the work and the rotary member to enable the rotary member to perform a finishing operation upon the work as it feeds the work, said abutment member being rendered operative by movement imparted thereto by the work.

6. In a machine of the class described, a work support comprising a pair of spaced fingers, an abrasive roll for performing a finishing operation on the work and arranged to engage and feed a piece of work along the support, and work restraining means extending between said fingers and constructed and arranged to engage the forward end of the work throughout the movement of the work along the support to prevent the work from moving at the same speed as that of the periphery of the abrasive roll.

7. In a machine of the class described, a smoothing roll, a yielding support comprising a pair of spaced fingers for holding a wood shank in feeding engagement with the roll, and means projecting between said fingers and rendered operative by movement imparted thereto by the shank to retard the feed of the shank to enable the roll to smooth the shank.

In testimony whereof I have signed my name to this specification.

EVERSLEIGH R. LAIRD.

CERTIFICATE OF CORRECTION.

Patent No. 1,882,020. October 11, 1932.

EVERSLEIGH R. LAIRD.

It is hereby certified that error appears in the printed specification of the above numbered patent requiring correction as follows: Page 3, line 45, strike out the words "to be operated upon to be fed beyond the" and insert the same after line 43; and that the said Letters Patent should be read with this correction therein that the same may conform to the record of the case in the Patent Office.

Signed and sealed this 1st day of August, A. D. 1933.

M. J. Moore.

(Seal) Acting Commissioner of Patents.